United States Patent
Kondo et al.

(10) Patent No.: US 6,473,876 B1
(45) Date of Patent: Oct. 29, 2002

(54) METHOD AND APPARATUS FOR ENCODING OF BITSTREAMS USING ROTATION

(75) Inventors: Tetsujiro Kondo, Kanagawa-Prefecture (JP); James J. Carrig, San Jose, CA (US); Yasuhiro Fujimori, Cupertino, CA (US); William Knox Carey, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/342,287

(22) Filed: Jun. 29, 1999

(51) Int. Cl.[7] .......................... G06F 11/00; G06F 11/30; G08C 25/00; H03M 13/00; H04L 1/00
(52) U.S. Cl. ........................................ 714/746; 714/701
(58) Field of Search ................................ 714/701, 702, 714/746

(56) References Cited

U.S. PATENT DOCUMENTS

| | | | |
|---|---|---|---|
| 3,311,879 A | 3/1967 | Daher | |
| 3,805,232 A | 4/1974 | Allen | |
| 3,811,108 A | * 5/1974 | Howell | ...................... 714/785 |
| 4,361,853 A | 11/1982 | Remy et al. | |
| 4,381,519 A | 4/1983 | Wilkinson et al. | ......... 358/21 R |
| 4,394,642 A | * 7/1983 | Currie et al. | .................. 341/81 |

(List continued on next page.)

FOREIGN PATENT DOCUMENTS

| | | | |
|---|---|---|---|
| EP | 0 359 729 A2 | 8/1989 | |
| EP | 0 398 741 A | 11/1990 | |
| EP | 0 527 611 | 8/1992 | ............ H04N/9/80 |
| EP | 0 558 016 | 2/1993 | .......... H04N/7/133 |
| EP | 0 566 412 A2 | 4/1993 | |

(List continued on next page.)

OTHER PUBLICATIONS

Kondo, et al., "Adaptive Dynamic Range Coding Scheme for Future HDTV Digital VTR", Fourth International Workshop on HDTV and Beyond, Sep. 4–6, Turin, Italy.

Kondo, et al., "A New Concealment Method for Digital VCR's", IEEE Visual Signal Processing and Communication, pp. 20–22, Sep. 1993, Melbourne, Australia.

Park, et al., "A Simple Concealment for ATM Bursty Cell Loss", IEEE Transactions on Consumer Electronics, No. 3, Aug. 1993, pp. 704–709.

Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

NHK Laboratories Note, "Error Correction, Concealment and Shuffling", No. 424, Mar. 1994, pp. 29–44.

Translation of Japanese Patent #7–67028, 30 pgs.

Kondo, et al., "Adaptive Dynamic Range Coding Scheme for Future Consumer Digital VTR", pp. 219–226.

(List continued on next page.)

*Primary Examiner*—Albert Decady
*Assistant Examiner*—Joseph D Torres
(74) *Attorney, Agent, or Firm*—Blakely, Sokoloff, Taylor & Zafman LLP

(57) ABSTRACT

The present invention includes a system and method for encoding data by altering data of a rotation block by a rotation factor dependent on data of a key block. In one embodiment, the data includes compression parameters that are descriptive of compressed data. In one embodiment, data of the second or rotation block is altered by calculating a rotation factor from data of a first or key block and altering data of second block in accordance with the rotation factor. In another embodiment, the present invention includes a method for recovering data when there are data losses by determining candidate rotation values for full decoding data of the second block and selecting a rotation value from the candidate rotation values corresponding to the first block data.

55 Claims, 7 Drawing Sheets

U.S. PATENT DOCUMENTS

| | | | |
|---|---|---|---|
| 4,419,693 A | 12/1983 | Wilkinson et al. | 358/167 |
| 4,509,150 A | 4/1985 | Davis | |
| 4,532,628 A | 7/1985 | Matthews | |
| 4,574,393 A | 3/1986 | Blackwell et al. | |
| 4,703,351 A | 10/1987 | Kondo | 358/135 |
| 4,703,352 A | 10/1987 | Kondo | 358/135 |
| 4,710,811 A | 12/1987 | Kondo | 358/135 |
| 4,722,003 A | 1/1988 | Kondo | 358/135 |
| 4,729,021 A | 3/1988 | Kondo | |
| 4,772,947 A | 9/1988 | Kono | 358/135 |
| 4,788,589 A | 11/1988 | Kondo | 358/133 |
| 4,796,299 A * | 1/1989 | Hamilton | 380/215 |
| 4,815,078 A | 3/1989 | Shimura | 370/30 |
| 4,845,560 A | 7/1989 | Kondo et al. | 358/133 |
| 4,890,161 A | 12/1989 | Kondo | 358/135 |
| 4,924,310 A | 5/1990 | Von Brandt | 358/136 |
| 4,953,023 A | 8/1990 | Kondo | 358/135 |
| 4,975,915 A | 12/1990 | Sako et al. | |
| 5,023,710 A | 6/1991 | Kondo et al. | 358/133 |
| 5,065,446 A * | 11/1991 | Suzuki et al. | 382/253 |
| 5,086,489 A | 2/1992 | Shimura | |
| 5,093,872 A | 3/1992 | Tutt | |
| 5,101,446 A | 3/1992 | Resnikoff et al. | |
| 5,122,873 A | 6/1992 | Golin | |
| 5,134,479 A | 7/1992 | Ohishi | |
| 5,142,537 A | 8/1992 | Kutner et al. | 371/31 |
| 5,150,210 A | 9/1992 | Hoshi et al. | |
| 5,159,452 A | 10/1992 | Kinoshita et al. | 358/141 |
| 5,166,987 A | 11/1992 | Kageyama | |
| 5,177,797 A | 1/1993 | Takenaka et al. | |
| 5,185,746 A | 2/1993 | Tanaka et al. | |
| 5,196,931 A | 3/1993 | Kondo | 358/133 |
| 5,208,816 A | 5/1993 | Seshardi et al. | 371/43 |
| 5,237,424 A | 8/1993 | Nishino et al. | 358/310 |
| 5,241,381 A | 8/1993 | Kondo | 358/133 |
| 5,243,428 A | 9/1993 | Challapali et al. | |
| 5,258,835 A | 11/1993 | Kato | 358/135 |
| 5,301,018 A | 4/1994 | Smidth et al. | |
| 5,307,175 A | 4/1994 | Seachman | |
| 5,307,377 A * | 4/1994 | Chouly et al. | 375/261 |
| 5,321,748 A | 6/1994 | Zeidler et al. | |
| 5,327,502 A | 7/1994 | Masuda et al. | 382/56 |
| 5,337,087 A | 8/1994 | Mishima | |
| 5,359,694 A | 10/1994 | Concordel | 358/445 |
| 5,379,072 A | 1/1995 | Kondo | 348/441 |
| 5,398,078 A | 3/1995 | Masuda et al. | 348/699 |
| 5,406,334 A | 4/1995 | Kondo et al. | |
| 5,416,522 A * | 5/1995 | Igarashi | 375/240.15 |
| 5,416,651 A | 5/1995 | Uetake et al. | 360/48 |
| 5,416,847 A | 5/1995 | Boze | |
| 5,428,403 A | 6/1995 | Andrew et al. | 348/699 |
| 5,434,716 A | 7/1995 | Sugiyama et al. | 360/32 |
| 5,438,369 A | 8/1995 | Citta et al. | 348/470 |
| 5,440,345 A | 8/1995 | Shimoda | |
| 5,446,456 A | 8/1995 | Seo | |
| 5,455,629 A | 10/1995 | Sun et al. | |
| 5,469,216 A | 11/1995 | Takahashi et al. | 348/441 |
| 5,469,474 A | 11/1995 | Kitabatake | |
| 5,471,501 A | 11/1995 | Parr et al. | 375/354 |
| 5,473,479 A | 12/1995 | Takahura | |
| 5,481,554 A | 1/1996 | Kondo | 371/53 |
| 5,481,627 A | 1/1996 | Kim | 382/254 |
| 5,490,177 A | 2/1996 | La Rosa et al. | |
| 5,495,298 A | 2/1996 | Uchida et al. | |
| 5,499,057 A | 3/1996 | Kondo et al. | |
| 5,528,608 A | 6/1996 | Shimizume | 371/40.3 |
| 5,557,420 A | 9/1996 | Yanagihara et al. | |
| 5,557,479 A | 9/1996 | Yanagihara | |
| 5,577,053 A | 11/1996 | Dent | |
| 5,583,573 A | 12/1996 | Asamura et al. | |
| 5,594,807 A | 1/1997 | Liu | |
| 5,598,214 A | 1/1997 | Kondo et al. | 348/414 |
| 5,617,333 A | 4/1997 | Oyamada et al. | |
| 5,625,715 A | 4/1997 | Trew et al. | 382/236 |
| 5,636,316 A | 6/1997 | Oku et al. | |
| 5,649,053 A | 7/1997 | Kim | |
| 5,663,764 A | 9/1997 | Kondo et al. | 348/414 |
| 5,673,357 A | 9/1997 | Shima | |
| 5,677,734 A | 10/1997 | Oikawa et al. | |
| 5,689,302 A | 11/1997 | Jones | |
| 5,699,475 A | 12/1997 | Oguro et al. | |
| 5,703,889 A | 12/1997 | Shimoda et al. | 371/55 |
| 5,724,099 A | 3/1998 | Hamdi et al. | |
| 5,724,369 A | 3/1998 | Brailean et al. | |
| 5,737,022 A | 4/1998 | Yamaguchi et al. | |
| 5,751,361 A | 5/1998 | Kim | |
| 5,751,743 A | 5/1998 | Takizawa | 371/41 |
| 5,751,862 A | 5/1998 | Williams et al. | |
| 5,751,865 A * | 5/1998 | Micco et al. | 382/296 |
| 5,786,857 A | 7/1998 | Yamaguchi | |
| 5,790,195 A | 8/1998 | Ohsawa | |
| 5,796,786 A | 8/1998 | Lee | 375/326 |
| 5,805,762 A | 9/1998 | Boyce et al. | 386/68 |
| 5,809,041 A | 9/1998 | Shikakura et al. | |
| 5,809,231 A | 9/1998 | Yokoyama et al. | |
| 5,812,146 A * | 9/1998 | Sato et al. | 345/501 |
| 5,841,781 A | 11/1998 | Takeda | |
| 5,841,794 A | 11/1998 | Inoue et al. | |
| 5,854,270 A | 12/1998 | Kondo et al. | 348/448 |
| 5,861,892 A * | 1/1999 | Sato et al. | 345/637 |
| 5,861,922 A | 1/1999 | Murashita et al. | |
| 5,878,183 A | 3/1999 | Sugiyama et al. | |
| 5,896,466 A | 4/1999 | Kim | |
| 5,903,481 A | 5/1999 | Kondo et al. | |
| 5,928,318 A | 7/1999 | Araki | |
| 5,933,571 A | 8/1999 | Bannai et al. | |
| 5,936,674 A | 8/1999 | Kim | |
| 5,940,411 A | 8/1999 | Takeda | |
| 5,944,851 A | 8/1999 | Lee | |
| 5,946,044 A | 8/1999 | Kondo et al. | |
| 5,987,183 A | 11/1999 | Saunders et al. | |
| 5,991,450 A * | 11/1999 | Ohsawa et al. | 382/245 |
| 6,026,190 A * | 2/2000 | Astle | 382/232 |
| 6,052,814 A | 4/2000 | Karasawa | |
| 6,065,119 A | 5/2000 | Sandford, II et al. | |
| 6,067,636 A | 5/2000 | Yao et al. | |
| 6,137,915 A | 10/2000 | Chai | |
| 6,163,868 A | 12/2000 | Kondo et al. | |
| 6,170,074 B1 | 1/2001 | Kondo et al. | |
| 6,191,710 B1 | 2/2001 | Waletzki | |
| 6,212,663 B1 | 4/2001 | Kondo et al. | |
| 6,198,851 B1 * | 5/2001 | Kato et al. | 382/248 |
| 6,229,929 B1 * | 5/2001 | Lynch et al. | 382/268 |
| 6,263,108 B1 | 7/2001 | Kondo et al. | |
| 6,263,468 B1 | 7/2001 | Kondo et al. | |
| 6,282,684 B1 | 8/2001 | Kondo et al. | |
| 6,295,008 B1 | 9/2001 | Kondo et al. | |
| 6,298,085 B1 | 10/2001 | Kondo et al. | |
| 6,311,293 B1 | 10/2001 | Kurshan et al. | |
| 6,311,297 B1 | 10/2001 | Kondo et al. | |
| 6,332,042 B1 | 12/2001 | Kondo et al. | |

FOREIGN PATENT DOCUMENTS

| | | | | |
|---|---|---|---|---|
| EP | 0 571 180 A2 | 5/1993 | | |
| EP | 0 592 196 A2 | 10/1993 | | |
| EP | 0 596 826 | 11/1993 | | H04N/5/92 |
| EP | 0 605 209 A2 | 12/1993 | | |
| EP | 0 610 587 | 12/1993 | | |
| EP | 0 597 576 A | 5/1994 | | |
| EP | 0 651 584 A2 | 10/1994 | | |
| EP | 0 680 209 | 4/1995 | | H04N/5/91 |

| | | | |
|---|---|---|---|
| EP | 0 746 157 A2 | 5/1996 | |
| EP | 0 806 872 A2 | 11/1997 | |
| EP | 0 851 679 A2 | 12/1997 | |
| EP | 818930 A2 * | 1/1998 | ............ H04N/7/26 |
| EP | 0 833 517 | 4/1998 | ............ H04N/7/30 |
| GB | 2 320 836 A | 11/1997 | |
| JP | 7-67028 | 3/1995 | .......... H04N/5/235 |
| JP | 09200757 A * | 7/1997 | ............ H04N/7/30 |
| WO | WO96/07987 | 9/1995 | |
| WO | WO99/21285 | 10/1998 | |
| WO | 99 21090 A | 4/1999 | |
| WO | WO 99/21369 | 4/1999 | |
| WO | WO 99 21369 A | 4/1999 | |
| WO | WO 01/01702 A1 | 1/2001 | |

OTHER PUBLICATIONS

Kim, et al., "Bit Rate Reduction Algorithm for a Digital VCR", IEEE Transactions on Consumer Electronics, vol. 37, No. 3, Aug. 1, 1992, pp. 267–274.

R.C. Gonzalez, et al., "Digital Image Processing", Addison Wesley Publishing Compant, Inc., 1992, pp. 346–348.

R. Aravind, et al., "Image and Video Coding Standards", AT&T Technical Journal, Jan./Feb. 1993, pp. 67–88.

Zhu, et al., "Coding and Cell–Loss Recovery in DCT–Based Packet Video", IEEE Transactions on Circuits and Systems for Video Technology, Jun. 3, 1993, No. 3, NY.

International Search Report, PCT/US98/22347, Mar. 16, 1999, 2 pgs.

International Search Report, PCT/US95/22531, Apr. 1, 1999, 1 pg.

International Search Report, PCT/US98/22411, Feb. 25, 1999, 1 pg.

International Search Report, PCT/US98/22412, Oct. 5, 1999, 5 pgs.

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.

International Search Report PCT/US00/03439, Feb. 9, 2000, 8 pgs.

International Search Report PCT/US00/03595, Feb. 10, 2000, 6 pgs.

International Search Report PCT/US00/03611, Feb. 10, 2000, 8 pgs.

International Search Report PCT/US00/03599, Feb. 10, 2000, 4 pgs.

International Search Report PCT/US00/03742, Feb. 11, 2000, 5 pgs.

International Search Report PCT/US00/03654, Feb. 10, 2000, 4 pgs.

International Search Report PCT/US00/03299, Feb. 9, 2000, 5 pgs.

Meguro, et al., "An Adaptive Order Statistics Filter Based On Fuzzy Rules For Image Processing", pp. 70–80, XP–00755627, 1997 Scripta Technica, Inc.

Jeng, et al., "Concealment Of Bit Error And Cell Loss In Inter–Frame Coded Video Transmission", 1991 IEEE, 17.4.1–17.4.5.

Monet, et al., "Block Adaptive Quantization Of Images", IEEE 1993, pp. 303–306.

International Search Report PCT/US00/03738, Feb. 11, 2000, 9 pgs.

Stammnitz, et al., "Digital HDTV Experimental System", pp. 535–542.

International Search Report PCT/US00/03508, Feb. 9, 2000, 8 pgs.

Chu, et al., Detection and Concealment of Transmission Errors in H.261 Images, XP–000737027, pp. 74–84, IEEE transactions, Feb. 1998.

Park, et al., "Recovery of Block–coded Images from Channel Errors", pp. 396–400, pub. Date May 23, 1993.

International Search Report PCT/US00/03743, 4 pgs., Feb. 11, 2000.

International Search Report PCT/US00/14311, 7 pgs., May 24, 2000.

International Search Report PCT/US00/14245, 9 pgs., May 24, 2000.

Chan, et al., "Block Shuffling On Top Of Error Concealment For Wireless Image Transmissions", vol. 3, Oct. 15, 1996, pp. 977–981.

Huifang Sun, et al., "Error Concealment Algorithms For Robust Decoding of MPEG Compressed Video", Sep. 1, 1997, pp. 249–268.

Brush: "Video Data Shuffling For The 4:2:2 DVTR", Oct. 1, 1986, pp. 1009–1016.

International Search Report PCT/US00/15679, 7 pgs., Oct. 24, 2000.

Chan, et al., Block Shuffling And Adaptive Interleaving For Still Image Transmission Over Rayleigh Fading Channels, May 1999, vol. 48, IEEE Transactions on Vehicular Technology, pp. 1002–1011.

Kondo, et al., New ADRC for Consumer Digital VCR, pp. 144–150, 1990, $8^{th}$ International Conference; Video, Audio and Data Recording.

Calgar, et al., New Efficient Shuffled Block Transform Design Techniques, Electronics Letters, vol. 30, No. 11, May 26, 1994.

* cited by examiner

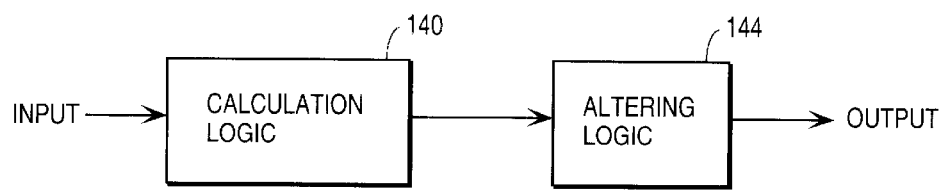
Fig. 1D   ENCODER
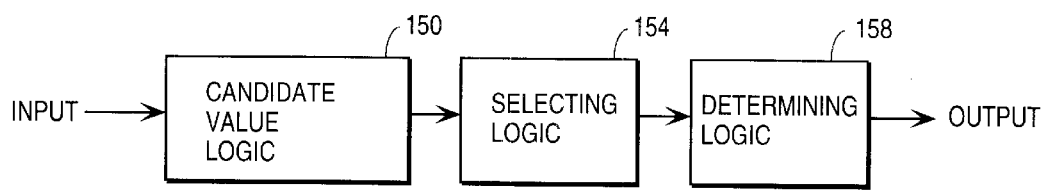
Fig. 1E   DECODER

EVEN BLOCK     ODD BLOCK

METHOD AND APPARATUS FOR ENCODING OF BITSTREAMS USING ROTATION

BACKGROUND OF THE INVENTION

1. Field of the Invention

The present invention relates to encoding of data to provide for robust error recovery due to data losses typically incurred during transmission of signals.

2. Art Background

A number of techniques exist for reconstructing lost data due to random errors that may occur during signal transmission or storage. However, these techniques cannot handle the loss of consecutive packets of data. Consecutive loss of packets of data is described in the art as burst error. Burst errors may result in a reconstructed signal with such a degraded quality that it is easily apparent to the end user. Additionally, compression methodologies used to facilitate high speed communications compound the signal degradation caused by burst errors, thus adding to the degradation of the reconstructed signal. Examples of burst error loss affecting transmitted and/or stored signals is seen in high definition television ("HDTV") signals, mobile telecommunication applications, as well as video storage technologies including video disk and video cassette recorders (VCRs).

In one application, the advent of HDTV has led to television systems with a much higher resolution than the current standards proposed by the National Television Systems Committee ("NTSC"). Proposed HDTV signals are predominantly digital. Accordingly, when a color television signal is converted for digital use it is common that the luminance and chrominance signals are digitized using eight bits. Digital transmission of NTSC color television requires a nominal bit rate of about two hundred and sixteen megabits per second. The transmission rate is greater for HDTV which would nominally require about 1200 megabits per second. Such high transmission rates are well beyond the bandwidths supported by current wireless standards. Accordingly, an efficient compression methodology is required.

Compression methodologies also play an important role in mobile telecommunication applications. Typically, packets of data are communicated between remote terminals in mobile telecommunication applications. The limited number of transmission channels in mobile communications requires an effective compression methodology prior to the transmission of packets. A number of compression techniques are available to facilitate high transmission rates.

Adaptive Dynamic Range Coding ("ADRC") and Discrete Cosine Transform ("DCT") Coding provide image compression techniques known in the art. Both techniques take advantage of the local correlation within an image to achieve a high compression ratio. However, an efficient compression algorithm can result in compounded error propagation because errors in an encoded signal are more prominent when subsequently decoded. This error multiplication can result in a degraded video image that is readily apparent to the user.

SUMMARY OF THE INVENTION

The present invention includes a system and method for encoding data by altering data of a rotation block by a rotation factor dependent on data of a key block. In one embodiment, the data includes compression parameters that are descriptive of compressed data. In one embodiment, data of the second block is altered by calculating a rotation factor from data of a first block and altering data of the second block in accordance with the rotation factor.

In another embodiment, the present invention includes a method for recovering data when there are data losses by determining candidate rotation values for full decoding data of the second block and selecting a rotation value from the candidate rotation values corresponding to the first block data.

BRIEF DESCRIPTION OF THE DRAWINGS

The objects, features and advantages of the present invention will be apparent from the following detailed description in which:

FIGS. 1D and 1E show embodiments of the present invention implemented as hardware logic.

DETAILED DESCRIPTION

Figure 1A:
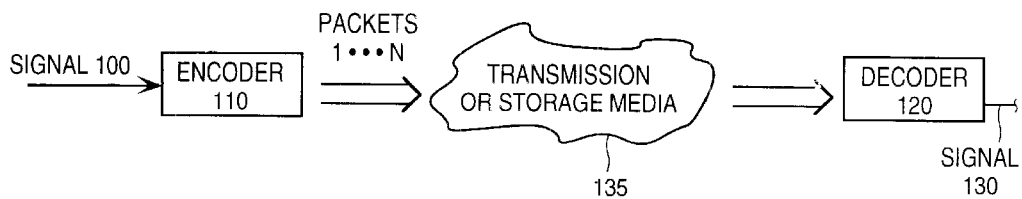
FIG. 1A shows an embodiment of the signal encoding, transmission, and subsequent decoding processes.

The present invention provides a method for coding and arranging a signal stream to provide for a robust error recovery and methods for performing error recovery. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The following is described in the context of Adaptive Dynamic Range Coding (ADRC) encoded images, and more particularly to the recovery of lost or damaged (lost/damaged) compression parameters such as dynamic range (DR) and minimum value (MIN). However, it is contemplated that the present invention is not limited to ADRC encoding and the particular compression parameters generated; rather it will be apparent that the present invention is applicable to different compression technologies, different types of correlated data, including, but not limited to, sound data and the like, and different compression parameters including, but not limited to, the maximum value (MAX) and central value (CEN) which may be used in ADRC processes. In addition, the present invention is applicable to different types of ADRC processes including edge-matching and non edge-matching ADRC. For further information regarding ADRC, see "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy. ADRC has been established as a feasible real-time technique for coding and compressing images in preparation for constant bit-rate transmission.

The discrete data points that make up a digital image are known as pixels. Typically, each pixel is represented independently using 8 bits, but other representations can also be used for the purposes of compression or analysis. Many representations begin by dividing this raw data into disjoint sets. For historical reasons, these sets, which may be composed of one or more pieces of data or pixels, are referred to as "blocks", even though they may not have a traditional block shape. The data may then be characterized by compression parameters. In one embodiment, these compression parameters include block parameters and bitstream parameters.

A block parameter includes data that describes how an image looks. The block parameter therefore may be used to define one or more attributes of a block. For example, in ADRC, block-wide information can include the minimum pixel value (MIN), the maximum pixel value (MAX), the central pixel value (CEN), and/or the dynamic range of the pixel values (DR).

A bitstream parameter may include data that describes how an image is encoded. In one embodiment, a bitstream parameter may indicate the number of bits used to encode data. For example, in ADRC, the bitstream parameters may include Qbit and motion flag (MF) values. In this embodiment, the bitstream parameter therefore can indicate how the data is encoded that represents where the pixel value lies within the range specified by the global information.

If a bitstream parameter is lost, the compressed image may be lost because the decoder will not know where the compressed block of data begins or ends. Therefore, an advantage of the present invention is providing for the recovery of data that describes how an image is encoded.

In one example in which ADRC encoding is used, the block data is comprised of the MIN, DR and Qbit number (defined below), and the pixel data is comprised of Qcodes. DR may be defined as MAX−MIN or MAX−MIN+1. CEN may be defined as a value set between MIN and MAX. For example, CEN may be equal to MIN+DR/2. A Qcode is an integer in the range $[0,2^Q-1]$ that identifies one value in the set $\{MIN, MIN+1, \ldots, CEN, \ldots, MAX\}$. Since the Qbit number, Q, is generally small and the DR value may be relatively large, it is generally not possible to represent all pixel values exactly. Therefore, some quantization error is introduced when pixel values are reduced to Qcode values. For instance, if the Qbit number is 3, then it is generally possible to represent $2^3=8$ values from the set $\{MIN, MIN+1, \ldots, CEN, \ldots, MAX\}$ without any error. Pixels with other values are rounded to one of these eight values. This rounding introduces quantization error.

Temporal compression is feasible for a sequence of like images spanning more than one instance in time. An image frame is defined as the 2-dimensional collection of pixels arising within a given time period. It is well known that data from corresponding locations of temporally close image frames is likely to contain similar values. When this is true, compression is improved by encoding each of these like values only once.

In a second example, multiple image frames are encoded by adding a motion flag (MF) to the block information of the first example. This MF indicates whether or not data from each frame is encoded using separate Qcodes. If no motion is indicated, the same Qcodes are used to represent each frame of data. If motion is indicated, then separate Qcodes are used to encode each frame.

Two methods of ADRC coding typically can be used: non-edge-matching ADRC, and edge matching ADRC. These methods differ in the precise formula used to generate the quantization code (Qcode) values. On the other hand, the methods have much in common. Both methods begin by segmenting the image into blocks, and then determining the maximum (MAX) and minimum (MIN) pixel value for each block. In 2D ADRC, one quantization code (Qcode) value is determined for each pixel. In 3D ADRC, a motion flag (MF) value (1 if motion, 0 otherwise) is determined for each block. When the motion flag is 1, a unique Qcode can be determined for each block. When the motion flag is 0, then corresponding pixel values can be averaged for each block, the MAX and MIN values are updated accordingly, and a single Qcode can be determined that will represent the corresponding pixels from each frame.

Non-edge-matching ADRC can define the DR value as $$DR = MAX - MIN + 1 \tag{1}$$

and a quantization code as $$q_i = \left\lfloor \frac{2^Q\left(x_i - MIN + \frac{1}{2}\right)}{DR} \right\rfloor \tag{2}$$

where Q is the number of quantization bits, and $x_i$ is the original pixel value (or averaged pixel value, in the case of non-motion blocks in 3D ADRC). Pixel values can be reconstructed according to the following formula:

$$x'_i = \left\lfloor MIN + \frac{DR\left(q_i + \frac{1}{2}\right)}{2^Q} \right\rfloor \tag{3}$$

where MAX represents the maximum level of a block, MIN represents the minimum level of a block, Q represents the number of quantization bits, $q_i$ represents the quantization code (encoded data), $x'_i$ represents the decoded level of each sample, and where it is expected that $x'_i \approx x_i$.

Edge-matching ADRC can define the DR value as $$DR = MAX - MIN \tag{4}$$

and a quantization code as $$q_i = \left\lfloor \frac{(2^Q - 1)(x_i - MIN)}{DR} + \frac{1}{2} \right\rfloor \tag{5}$$

where Q is the number of quantization bits, and $x_i$ is the original pixel value (or averaged pixel value, in the case of non-motion blocks in 3D ADRC). Pixel values can be reconstructed according to the following formula:

$$x'_i = \left\lfloor MIN + \frac{DR(q_i)}{2^Q - 1} + \frac{1}{2} \right\rfloor \tag{6}$$

where MAX represents the maximum level of a block, MIN represents the minimum level of a block, Q represents the number of quantization bits, $q_i$ represents the quantization code (encoded data), $x'_i$ represents the decoded level of each sample, and where it is expected that $x'_i \approx x_i$.

In Central Value ADRC, the central value (CEN) can be transmitted in place of the MIN value. In one embodiment, the CEN value may be defined as $$CEN = MIN + DR/2 \qquad (7)$$

To minimize rounding errors the CEN value might actually be computed as $CEN=MIN+\lfloor(DR+1)/2\rfloor$ in a practical system. In this embodiment, the reconstruction formulas for $x'_i$ may be found by substituting MIN=CEN−DR/2 in Eqs. (3) and (6). That is, for non-edge-matching ADRC $$x'_i = \left\lfloor CEN + \frac{DR}{2^Q}\left(q_i + \frac{1}{2} - 2^{Q-1}\right)\right\rfloor \qquad (8)$$

and in the case of edge-matching ADRC $$x'_i = \left\lfloor CEN + \frac{1}{2} + DR\left(\frac{q_i}{2^Q - 1} - \frac{1}{2}\right)\right\rfloor \qquad (9)$$

In the error-free case, the performance of Central Value ADRC using CEN is similar to ADRC using a MIN value. However, in the presence of DR loss, Central Value ADRC may provide better lost/damaged data recovery performance compared with the MIN value ADRC.

Variable length image compression schemes, such as ADRC, are designed to distribute most compression bits to the highly active parts of an image. Naturally, this distribution is data dependent, and so the decoder needs special knowledge to decipher the bitstream. Qbit and MF values are examples of bitstream parameters which describe the distribution of bits, thus enabling the decoder to decipher the bitstream. When a bitstream parameter is lost, the decoder is in danger of losing all of the data that remains to be decompressed. Therefore, accurate recovery methods are advantageous.

The rotation method of the present invention supports the recovery of data, including compression parameters such as the bitstream parameters or block parameters discussed above. In one embodiment, data from a second or rotation block is modified by a rotation factor that is dependent on data of a first or key block. When selected data of the first block is subsequently destroyed during transmission, it may be recovered by using the rotation factor used to modify the second block.

The signal encoding, transmission, and subsequent decoding processes are generally illustrated in FIG. 1A. Signal 100 is a data stream input to Encoder 110. Encoder 110 can follow the Adaptive Dynamic Range Coding ("ADRC") compression algorithm and generate Packets 1, . . . N for transmission along transmission Media 135. Decoder 120 receives Packets 1, . . . N from Transmission Media 135 and generates Signal 130. Signal 130 is a reconstruction of Signal 100.

Figure 1B:
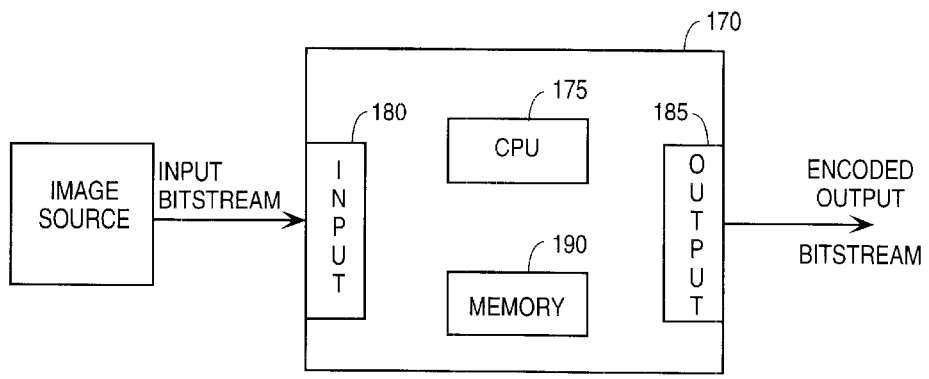
FIGS. 1B and 1C show embodiments of the present invention implemented as software executed by a processor.
Figure 1C:
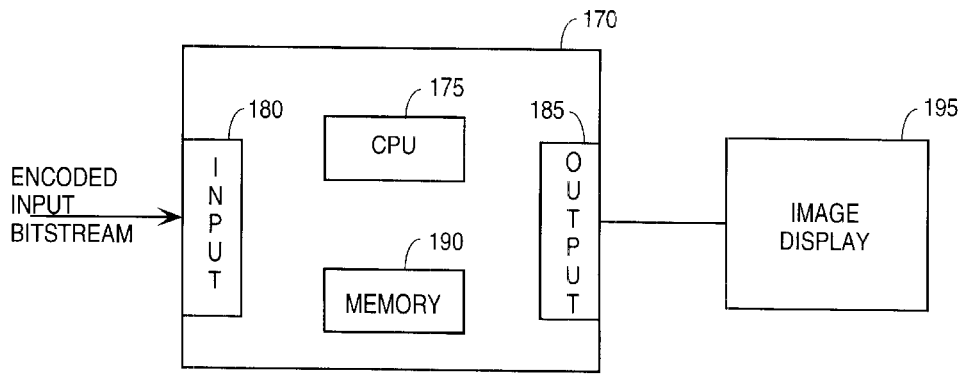

Encoder 110 and Decoder 120 can be implemented a variety of ways to perform the functionality described herein. In one embodiment, Encoder 110 and/or Decoder 120 are embodied as software stored on media and executed by a general purpose or specifically configured computer system, typically including a central processing unit, memory and one or more input/output devices and co-processors, as shown in FIGS. 1B and 1C. Alternately, the Encoder 110 and/or Decoder 120 may be implemented as logic to perform the functionality described herein, as shown in FIG. 1D. In addition, Encoder 110 and/or Decoder 120 can be implemented as a combination of hardware, software or firmware.

Embodiment of the circuits for encoding and recovering lost/damaged compression parameters are shown in FIGS. 1B and 1C. The methods described herein can be implemented on a specially configured or general purpose processor system 170. Instructions are stored in the memory 190 and accessed by the processor 175 to perform many of the steps described herein. An input 180 receives the input bitstream and forwards the data to the processor 175. The output 185 outputs the data. In FIG. 1B, the output may consist of the encoded data. In FIG. 1C, the output may consist of the decoded data, such as image data decoded once the compression parameter is recovered, sufficient to drive an external device such as display 195. In another embodiment, the output 185 outputs the recovered compression parameter. The recovered compression parameter is then input to other circuitry (not shown) to generate the decoded data.

An alternate embodiment of the circuits for encoding compression parameters and recovering lost/damaged compression parameters are shown in FIGS. 1D and 1E. The methods described herein may be implemented in specially configured logic, such as Application Specific Integrated Circuits (ASIC), large scale integration (LSI) logic, a programmable gate array, or one or more processors. In FIG. 1D, calculation logic 140 calculates the rotation factor. Altering logic 144 rotates the block of data using the rotation factor. FIG. 1E shows an alternate embodiment of the circuit for recovering lost/damaged compression parameters. Candidate value logic 150 generates candidate values for the compression parameter. Selecting logic 154 selects the compression parameter from the candidate values. Determining logic 158 determines the lost/damaged compression parameters. The output of the circuit is preferably coupled to additional logic that decodes using data including the recovered compression parameter. In one embodiment in which the data is image data, the decoded data is used to drive a display device.

Figure 2A:
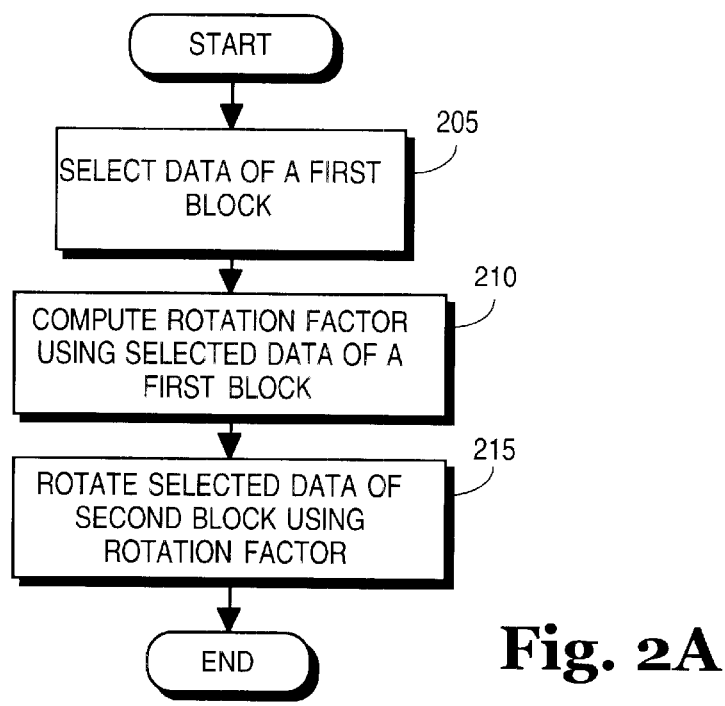
FIG. 2A shows an embodiment of the method of the present invention for encoding data.

One embodiment of a process for encoding using rotation is illustrated by the flow diagram of FIG. 2A. At step 205, data of a first block is selected to be used to perform the rotation process discussed below. In one embodiment, the data selected includes one or more compression parameters such as bitstream parameters generated during compression of the data. In one embodiment in which ADRC is used, the selected data may be Qbit and MF values. However, other data, including other compression parameters may be used.

At step 210 a rotation factor is computed using the selected data. A variety of equations may be used to compute a rotation factor. In one embodiment, the rotation factor is computed such that each possible value of the selected data generates a unique rotation factor. In one embodiment in which Qbit and MF are used, the rotation factor may be computed such that each possible pairing of Qbit and MF values generates a unique rotation factor. Alternatively, non-unique rotation factors may be computed.

At step 215, selected data of a second block is altered using the rotation factor. This altered selected data is transmitted and may be used subsequently to recover lost selected data of the first block. In one embodiment, the rotation factor is used to rotate, e.g. bit shift with wrap around, the selected data. Other data modification processes may be used, such as randomizing mathematical equations and the like.

Figure 2B:
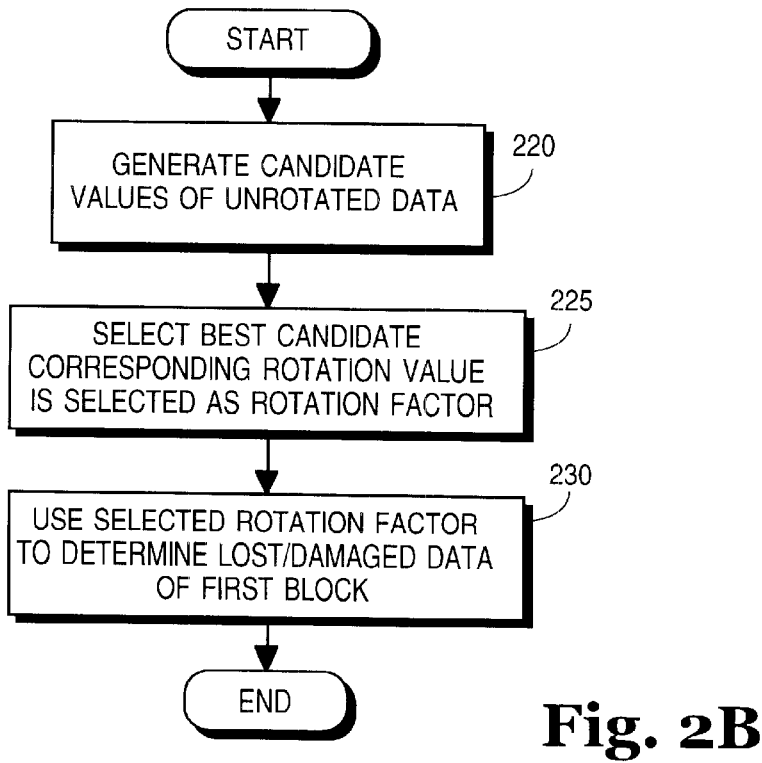
FIG. 2B shows an embodiment of the method of the present invention for recovering lost or damaged data.

FIG. 2B generally describes one embodiment of a process for recovering lost/damaged data. In this embodiment, the selected data of the first block (used to generate the rotation factor of the second block as described with reference to FIG. 2A) have been lost or damaged and the rotated data of the second block is used to estimate selected data of the first block. Referring to FIG. 2B, at step 220 candidate rotation values, or candidate values of recovered unaltered data, of the rotated data are generated. The candidate values of recovered unaltered data correspond to selected altered data of the second block.

At step 225, the candidate values are evaluated to determine the lost candidate and the corresponding selected rotation factor. The selected rotation factor, or recovered unaltered value, is selected from the candidate values. At step 230, the selected rotation factor is used to determine the lost/damaged data using a computation derived from the equation used to generate the rotation factor during the encoding process (e.g. FIG. 2A, step 210 ). In one embodiment in which a unique rotation factor is generated for each possible value of the selected first block data, the computation, step 230, will estimate the corresponding selected first block data. In an alternate embodiment in which the rotation factor generated is not unique, once the corresponding rotation factor is known, other evaluation techniques, e.g. mean square error, linear error, etc., may be used to estimate the lost/damaged data of the first block.

Figure 3:
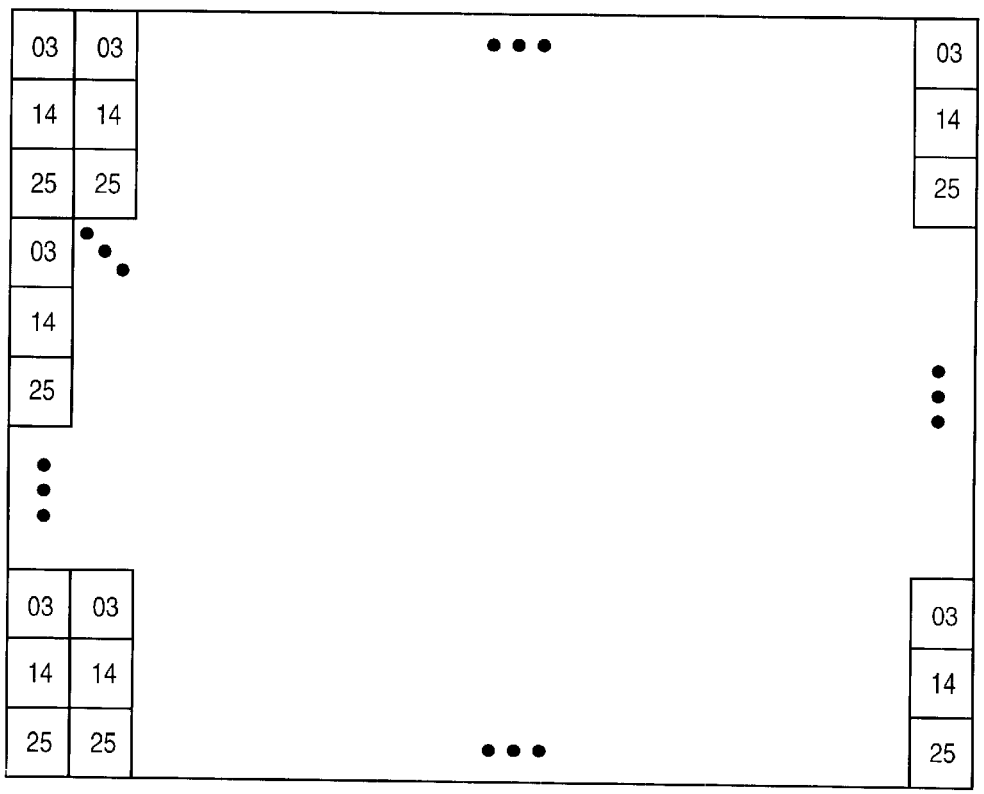
FIG. 3 shows an image laid out into an exemplary pattern of rectangular blocks.

Examples of the processes of encoding data and recovering lost/damaged data will now be discussed. First, pixels of an image are grouped to form equal sized rectangular blocks, where each block has an even number of pixels. For simplicity, assume that the image is a multiple of 3 blocks high. The blocks are cyclically labeled 0, 1, 2, and 3, 4, 5. The blocks 0 and 3 overlap, as shown in FIG. 3. Similarly, blocks 1 and 4; and blocks 2 and 5 overlap. Thus, the blocks in FIG. 3 are labeled 03, 14, and 25. (Of course, other layouts are possible.)

Figure 4A:
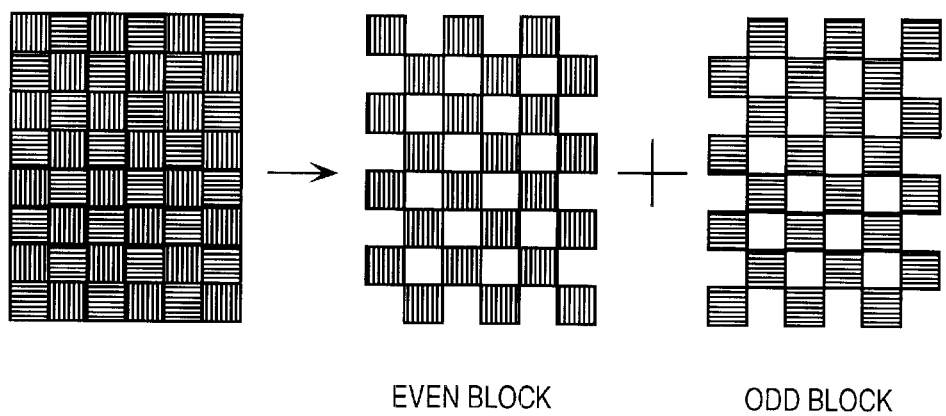
FIG. 4A shows rectangular regions of an image decomposed into one embodiment of even and odd subsample blocks.
Figure 4B:
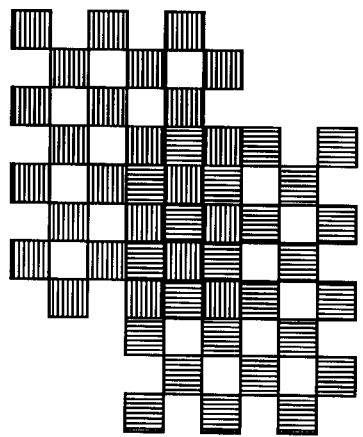
FIG. 4B shows one embodiment of even and odd block definitions shifted relative to one another to increase robustness.

Each block may be separated into two subsample blocks, as shown in FIG. 4A. For purposes of discussion herein the block which contains the upper left-hand pixel is referred to as an even block, and the block containing the upper right-hand pixel is referred as an odd block. Let the even subsample blocks labeled 03, 14, and 25 belong to segments 0, 4, and 2 respectively. Similarly, let the odd subsample blocks labeled 03, 14, and 25 belong to segments 3, 1, and 5 respectively. In this way, every pixel is mapped to a subsample block in one of 6 segments, with an even segment block fully overlapping a corresponding odd segment block. Alternately the blocks may be shifted relative to one another to increase robustness. An example is shown in FIG. 4B.

Figure 5:
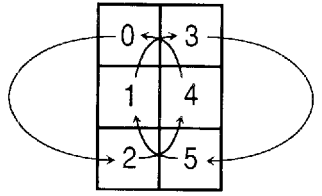
FIG. 5 shows one embodiment of rotation blocks associated with key blocks.

Each block acts as a key block for another block called a rotation block, as shown in FIG. 5. Thus each block acts as a key block under one pairing, and a rotation block under another pairing. A rotation block is a block for which selected data is altered according to selected data of one or more key blocks. Therefore, a key block is a block the selected data of which is used to alter selected data in another block. In one embodiment in which ADRC encoding is used, selected data of the rotation block may be compression parameters including block level parameters such as MIN, MAX, DR and CEN. In one embodiment, selected data of the key block may be compression parameters including bitstream parameters such as Qbit and MF.

For example, suppose all segment 0 blocks act as key blocks for corresponding rotation blocks in segment 2, as shown in FIG. 5. Also suppose that the bitstream parameters are Qbit values 2, 3, or 4 and MF values 0 or 1. The combination of the Qbit value with the MF value will be one of N possibilities. In this case, N is 6. The six different possibilities and the rotation factor associated with each possibility are shown in the Table below.

| Qbit | MF | Factor |
|---|---|---|
| 2 | 0 | 0 |
| 3 | 0 | 1 |
| 4 | 0 | 2 |
| 2 | 1 | 3 |
| 3 | 1 | 4 |
| 4 | 1 | 5 |

The rotation factor associated with each combination of the Qbit and MF values is an integer between 0 and N−1. This provides a unique rotation factor for every possible Qbit and MF value. Therefore, the Qbit and MF values can be easily determined from the rotation factor. For this example, where there are 6 different combinations of Qbit and MF values (since there are $N_Q=3$ allowable Qbit values each paired with 2 possible MF values), and the minimum Qbit value $Q_{MIN}=2$, the rotation factor is defined as $$\text{Rotation factor}=N_Q \cdot MF^{key}+Qbit^{key}-Q_{MIN}=\{0, \ldots, 5\} \quad (10)$$

A value of the rotation block ($VAL^{Rot}$) can be altered as follows:

$$(VAL^{Rot})_{trans}=(VAL^{Rot}+[256/N]\cdot\text{factor})\bmod 256 \quad (11)$$

where VAL is a compression value of the rotation block that is altered. This value can be CEN, MIN, MAX, DR, or any other compression value. In this example, the central value is rotated. Therefore, the CEN value is altered as follows:

$$(CEN^{Rot})_{trans}=(CEN^{Rot}+[256/N]\cdot\text{factor})\bmod 256 \quad (12)$$

where $(CEN^{Rot})_{trans}$ is transmitted in place of the original value $CEN^{Rot}$. The value [256/N] was determined as the maximum spreading distance for a modulo 256 rotation with N possible rotation factors. In one embodiment, [256/N] corresponds to a value of 42.

Now suppose the key block's Qbit and MF values are 3 and 1, respectively, and the rotation block's CEN value is 147. Then the rotation factor is computed as 3·1+3−2=4, and $(CEN^{Rot})_{trans}$ is computed as (147+42·4)mod 256=59. The value 59 is then transmitted in place of the rotation block's true value of 147.

When there is no transmission loss, the central value $CEN^{Rot}$ can be easily determined by calculating the rotation factor from the $MF^{key}$ and the $Qbit^{key}$ values using equation (10), then using equation (12) to solve for $CEN^{Rot}$. Thus, in the case of error-free decoding, the decoder receives $(CEN^{Rot})_{trans}=59$, $Qbit^{key}=3$, and $Mf^{key}=1$. The rotation factor can then be calculated:

$$\text{rotation factor}=3\cdot MF^{key}+Qbit^{key}-2=4 \quad (13)$$

Finally, the block level parameter ($CEN^{Rot}$) can be restored:

$$CEN^{Rot}=((CEN^{Rot})_{trans}-42\cdot\text{factor})\bmod 256 \quad (14)$$

$$CEN^{Rot}=(59-42\cdot4)\bmod 256=147 \quad (15)$$

However, there may be a loss during transmission. Now suppose the bitstream suffers 1/6 damage such that all blocks in segment 0 lose their DR, Qbit, and MF values, and all blocks in segment 4 lose their CEN values. Qcode loss is distributed throughout. The recovery process works by estimating the CEN value of the rotation block. This may be estimated since it is assumed that the CEN and DR values from segments 2 and 5 are undamaged. This estimate is compared against all candidate CEN values. The candidate value which is closest to the estimate is assumed to be the correct decoding, and the corresponding rotation factor and bitstream parameters are thus determined.

To illustrate the recovery process when there is a transmission error, assume that the key block's Qbit and MF values were both lost during transmission, but the rotation key block's transmitted central value $(CEN^{Rot})_{trans}$ of 59 was received. Because the Qbit and MF values are lost, the decoder does not know what the rotation factor is. The rotation factor can be any integer from 0 to 5. Therefore, each one of these possible rotation factors is placed into equation (14), and a list of candidate values for $CEN^{Rot}$ is calculated. One of the candidate values is the correct value for $CEN^{Rot}$.

For example, when a rotation factor of 1 is used in equation (14), the value $CEN^{Rot}$ is 17. Using the equation $CEN^{Rot}=((CEN^{Rot})_{trans}-42 \cdot factor)\mod 256$, the possible values are as follows:

| Factor | (59–42 × factor) mod 256 |
|---|---|
| 0 | 59 |
| 1 | 17 |
| 2 | 231 |
| 3 | 189 |
| 4 | 147 |
| 5 | 105 |

The decoder may use a variety of techniques to estimate the value of CEN. For example, several techniques for estimating MIN are known, as discussed below. These methods can also be used to estimate CEN, because CEN=MIN+[DR/2]. Thus, replacing MIN with CEN−[DR/2] in the expressions below, and solving for CEN, will provide an estimate of CEN.

MIN may be estimated as the value that minimizes an average difference between decoded values from the block and corresponding decoded values from at least one neighboring block. The average function can be a weighted average of neighboring values, for example, the values may be weighted relative to the location of the neighboring block with respect to the block of interest. In one embodiment, MIN may be estimated using a least squares estimation. For example, MIN may be determined as follows:

Non edge-matching ADRC $$MIN = \frac{2^{Q+Q'+1} \cdot N \cdot MIN' + 2^Q \cdot DR' \cdot \sum_{i=1}^{N}(2e'_i + 1) - 2^{Q'} \cdot DR \cdot \sum_{i=1}^{N}(2e_i + 1)}{2^{Q+Q'+1} \cdot N} \quad (16)$$

Edge-matching ADRC $$MIN = \frac{(2^Q - 1) \cdot (2^{Q'} - 1) \cdot N \cdot (2MIN' + 1) + 2 \cdot (2^Q - 1) \cdot DR' \cdot \sum_{i=1}^{N} e'_i - 2 \cdot (2^{Q'} - 1) \cdot DR \cdot \sum_{i=1}^{N} e_i}{2 \cdot (2^Q - 1) \cdot (2^{Q'} - 1) \cdot N} \quad (17)$$

where N represents a number of neighboring encoded data to use, MIN' represents the MIN value of the neighboring block, DR and DR' respectively represents the DR value of the block and the neighboring block, Q represents a number of quantization bits used to encode the block, Q' represents a number of quantization bits used to encode the neighboring block, $e_i$ represents the encoded data (e.g., Qcodes) and $e'_i$ represents the encoded neighboring data, such as the encoded data, of the neighboring block.

The DR value may be used in place of the CEN or MIN value. Therefore, if the DR value is lost/damaged, the MIN value and Qcodes of the block and the DR, MIN and Qcodes of the neighboring block are used to estimate DR.

In one embodiment, DR may be estimated using a least squares estimation. For example:
An Integer Formula for Non Edge-matching ADRC $$DR = \frac{2^{Q+1} \cdot (MIN' - MIN) \cdot \sum_{i=1}^{N}(2e_i + 1) + 2^{Q-Q'} \cdot DR' \cdot \sum_{i=1}^{N}(2e'_i + 1) \cdot (2e_i + 1)}{\sum_{i=1}^{N}(2e_i + 1)^2} \quad (18)$$

An Integer Formula for Edge-matching ADRC $$DR = \frac{(2^Q - 1) \cdot (2^{Q'} - 1) \cdot (2MIN' - 2MIN + 1) \cdot \sum_{i=1}^{N} e_i + 2 \cdot (2^Q - 1) \cdot DR' \cdot \sum_{i=1}^{N}(e'_i \cdot e_i)}{2 \cdot (2^{Q'} - 1) \cdot \sum_{i=1}^{N}(e_i)^2} \quad (19)$$

where N represents a number of neighboring encoded data to use, MIN and MIN' respectively represent the MIN value of the block and the neighboring block, Q represents a number of quantization bits used to encode, Q' represents a number of quantization bits used to encode the neighboring block, $e_i$ and $e'_i$ respectively represent the encoded data of the block and the neighboring block and DR' represents the dynamic range of the neighboring block.

In another embodiment, an alternate recovery formula may be used. DR may be estimated as the value that makes the sum of decoded values of the block equal to the sum of the decoded values of the neighboring block. For example, DR is determined according to the following equation:
Non Edge-matching ADRC $$DR = \frac{2^Q \sum_{i=1}^{N}[DR'(2e'_i + 1) + 2^{Q'+1}(MIN' - MIN)]}{2^{Q'} \sum_{i=1}^{N}(2e_i + 1)} \quad (20)$$

Edge-matching ADRC $$DR = \frac{(2^Q - 1) \sum_{i=1}^{N}[DR' e'_i + (2^{Q'} - 1)(MIN' - MIN)]}{(2^{Q'} - 1) \sum_{i=1}^{N} e_i} \quad (21)$$

where N represents a number of neighboring encoded data to use, MIN and MIN' respectively represent the MIN value of the block and the neighboring block, Q represents a number of quantization bits used to encode, Q' represents a number of quantization bits used to encode the neighboring block, $e_i$ and $e_i'$ respectively represent the encoded data of the block and the neighboring block and DR' represents the dynamic range of the neighboring block.

Other embodiments are also contemplated. For example, if MIN and MAX are used as compression parameters, and one of them is damaged, DR is estimated and the compression parameter is computed from the estimated DR. Furthermore, if MAX and DR are used, processing similar to MIN and DR described herein is used. Furthermore, other parameters not specifically identified herein may be used. It is contemplated that other parameters may function similar to MIN and appropriate equations would be derived therefrom.

Therefore, the value of the compression parameter in the present example, CEN can be estimated. Suppose, for instance, the estimate is $$(CEN^{Rot})_{est} = 150. \tag{22}$$

The decoder determines that the closest candidate value to the estimate of 150 is 147, using the table computed earlier, which corresponds to a rotation factor of 4. Thus, the decoder determines that the proper CEN value of the rotation block is 147 and that the lost Qbit and MF values of the key block are 3 and 1, respectively. Note the minimum distance between the possible values of $CEN^{Rot}$ is 42, and so this procedure works provided the CEN estimate is within 42/2=21 of the correct value. This is the spreading distance, which is the minimum difference between transmitted values corresponding to two different rotation factors.

Variations on the above description involve changing the number of segments or the rotation quantities. For example, the DR values, the complementary CEN values, the MIN value, frequency component, or any other appropriate value of the rotation block may be rotated. Other variations involve using multiple key blocks together to transform the block level parameters of multiple rotation blocks.

The rotation factor can also be changed. For example, the rotation factor equation could include the LSB's of the DR for the key block, or the CEN value of the key block, or any other appropriate value of the key block. Auxiliary information that narrows the range of allowable DR values can also be added to the rotation factor equation.

Another variation involves using the key block's Qbit and MF values to shuffle Qcode values. Using this variation, other recovery methods, which rely on Qcode correlations, such as those known in the art, may be combined with the currently proposed methods.

Figure 6:
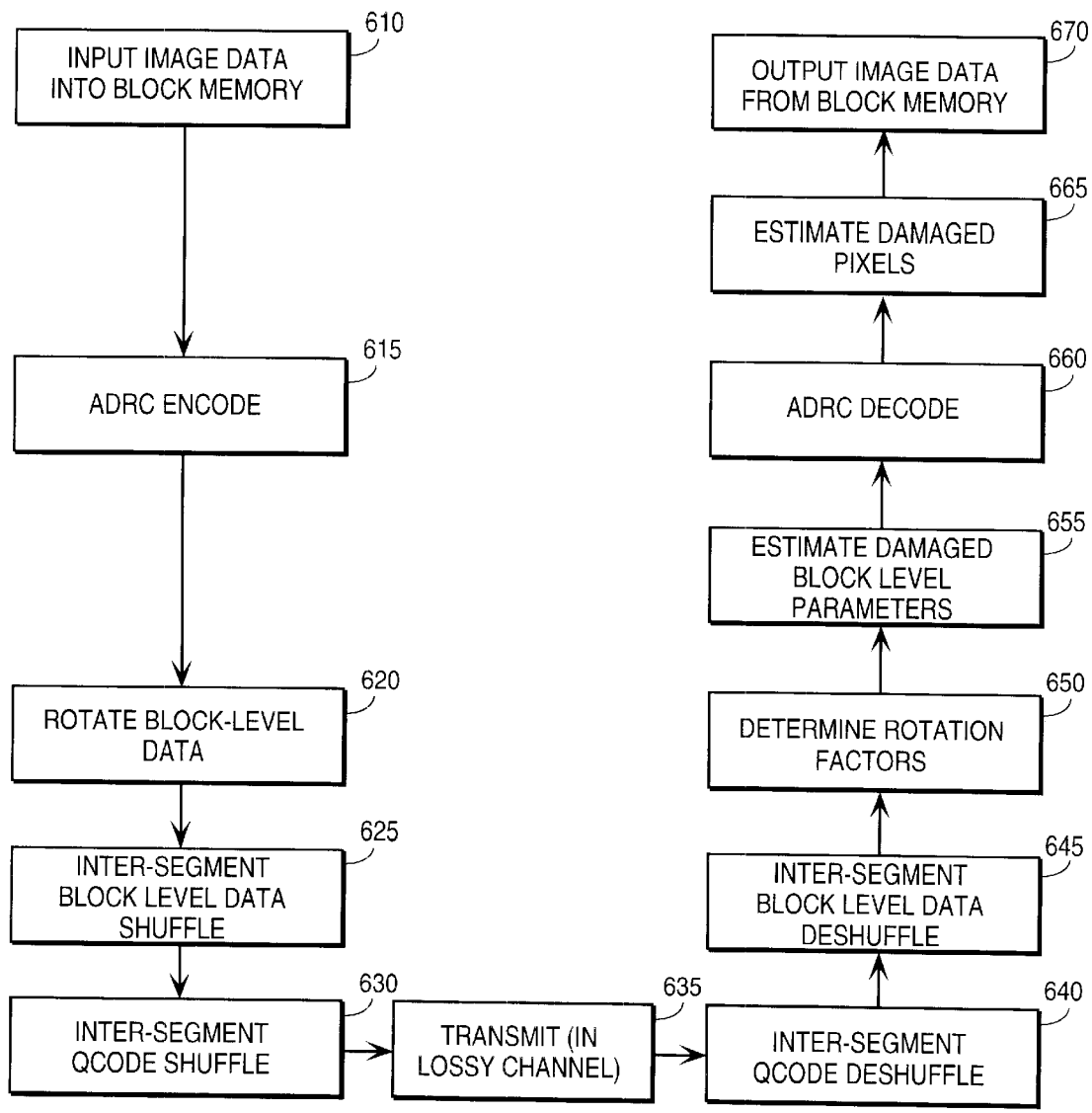
FIG. 6 shows one embodiment of how the rotation method can be used in Adaptive Dynamic Range Coding method.

FIG. 6 gives an example of how the rotation method may be used within the context of an ADRC image transmission system. In one embodiment, the data block may consist of CEN, DR, and MF values, and possibly an ADRC table threshold indices. The Qbit values may be derived from the DR values, for example, using a threshold table of DR values which specify possible corresponding Qbit values.

The proposed system has many strengths. One strength is that the same circuit that is used to estimate lost block parameters may also be used to determine the rotation factors. This dual-use reduces system complexity and cost. Another strength is that, in a system in which Qcodes are not shuffled, parallel candidate evaluation is not required, since the decoder simply selects the closest match from an easily determined list. A third strength is that only the most trivial types of shuffling are demanded while providing error recovery robustness.

At step 610, the image data is input into block memory. At step 615, the data is encoded. The selected block data in each rotation block is rotated according to selected data in a corresponding key block, step 620. Segments formed of multiple blocks are shuffled prior to transmission, 625. Examples of the shuffling process are described in PCT application number 111, 116 published [to be inserted]. Upon receipt of data transmitted at step 635, deshuffling processes are performed, step 640, 645. As discussed earlier herein, rotation factors are determined, step 650, and block parameters are estimated, step 655. ADRC decoding is then performed, step 660. Any pixels damaged are estimated, step 665 and the data is output, step 670.

Although the present invention is discussed with respect to three dimensional image (e.g., video) data, the present invention may be used with any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo.

The invention has been described in conjunction with the preferred embodiment. It is evident that numerous alternatives, modifications, variations and uses will be apparent to those skilled in the art in light of the foregoing description.

We claim:

1. A method for encoding data comprising:
   calculating a rotation factor from a selected data of a first block; and
   altering a selected data of a second block in accordance with the rotation factor such that if the selected data of the first block is lost the rotation factor may be used to estimate the selected data of the first block.

2. The method of claim 1, wherein the selected data of the first block is selected from the group comprising at least one compression parameter, at least one block parameter and at least one bitstream parameter.

3. The method of claim 1, wherein selected data of the second block is selected from the group comprising at least one compression parameter, at least one block parameter and at least one bitstream parameter.

4. The method of claim 1, wherein Adaptive Dynamic Range Coding (ADRC) is used and the selected data of the first block is selected from the group comprising a value representative of a number of bits used to encode data (Qbit) and a motion flag value (MF).

5. The method of claim 4, wherein the altering comprises:
   calculating a rotation factor from the selected data of the first block, wherein the rotation factor is determined as:

$$\text{Rotation factor} = N_Q \cdot MF^{key} + Qbit^{key} - Q_{MIN},$$

where $MF^{key}$ is the motion flag value of the first block, $Qbit^{key}$ is the Qbit value of the first block, $N_Q$ is the number of allowable Qbit values, and $Q_{MIN}$ is the minimum allowable Qbit value; and
   altering the selected data of the second block in accordance with the rotation factor.

6. The method of claim 1, wherein Adaptive Dynamic Range Coding (ADRC) is used and the selected data of the second block is selected from the group consisting of a dynamic range value (DR), minimum value (MIN), maximum value (MAX) and central value (CEN).

7. The method of claim 6, wherein data is altered by the rotation factor according to:

$$(VAL^{Rot})_{trans} = (VAL^{Rot} + (256/N) \cdot \text{rotation factor}) \bmod 256,$$

where $VAL^{Rot}$ represents the unaltered value of the selected data of the second block, $(VAL^{Rot})_{trans}$ represents the altered value of the selected data of the second block, and N represents a range of values for the rotation factor.

8. A method for recovering lost/damaged data of a first block comprising:
   receiving an altered data of a second block;
   determining candidate values of recovered unaltered data corresponding to selected altered data of the second block, the altered data created by altering a selected data of the second block in accordance with a rotation factor calculated from a selected data of the first block such that the lost/damaged data of the first block may be estimated;
   selecting a recovered unaltered value from the candidate values; and
   determining recovered lost/damaged data of first block from the selected recovered unaltered value.

9. The method of claim 8, wherein the candidate values are determined by:

$$VAL^{Rot}=((VAL^{Rot})_{trans}-(256/N)\cdot\text{rotation factor})\bmod 256,$$

where $VAL^{Rot}$ represents recovered unaltered data, $(VAL^{Rot})_{trans}$ represents the altered value of the selected data of the second block, and N represents one of a set of possible rotation factors and is varied for determination of each candidate value.

10. The method of claim 8 wherein the lost/damaged data comprises at least one compression parameter, said method further comprising:
    determining a rotation factor from the selected recovered unaltered value;
    determining at least one of the compression parameters of a first block associated with the second block using the rotation factor.

11. The method of claim 8, wherein the recovered unaltered data comprises block parameters.

12. The method of claim 8, wherein the lost/damaged data comprises bitstream parameters.

13. The method of claim 8, herein Adaptive Dynamic Range Coding (ADRC) is used and the recovered unaltered data is selected from the group comprising dynamic range value (DR), minimum value (MIN), maximum value (MAX) and central value (CEN).

14. The method of claim 8, wherein Adaptive Dynamic Range Coding (ADRC) is used and the lost/damaged data is selected from the group comprising a value representative of a number of bits used to encode data (Qbit) and a motion flag (MF) value.

15. A method of encoding a stream of data points comprising:
    encoding a stream of data points to form a plurality of blocks of encoded data; and
    altering at least one block parameter of a second block by using a factor that is dependent on a bitstream parameter of a first block, said block parameter representative of the encoding of data points of the block and said bitstream parameter representative of how bits are utilized to encode the first block such that if the bitstream parameter of the first block is lost the factor may be used to estimate the bitstream parameter of the first block.

16. The method of claim 15, wherein the data points represent information selected from the group comprising: two-dimensional static images, hologram images, three-dimensional static images, video, two-dimensional moving images, three dimensional moving images, monaural sound, and N-channel sound.

17. The method of claim 15, wherein the blocks are selected from the group comprising:
    complementary blocks, shifted blocks, randomized blocks, and shuffled blocks.

18. A computer readable medium containing executable instructions, which, when executed in a processing system, causes the system to perform the steps for encoding data, comprising:
    calculating a rotation factor from a selected data of a first block; and
    altering a selected data of a second block in accordance with the rotation factor such that if the selected data of the first block is lost the rotation factor may be used to estimate the selected date of the first block.

19. The computer readable medium of claim 18, wherein the selected data of the first block is selected from the group comprising at least one compression parameter, at least one block parameter and at least one bitstream parameter.

20. The computer readable medium of claim 18, wherein selected data of the second block is selected from the group comprising at least one compression parameter, at least one block parameter and at least one bitstream parameter.

21. The computer readable medium of claim 18, wherein Adaptive Dynamic Range Coding (ADRC) is used and the selected data of the first block is selected from the group comprising a value representative of a number of bits used to encode data (Qbit) and a motion flag value (MF).

22. The computer readable medium of claim 21, wherein the altering comprises:
    calculating a rotation factor from the selected data of the first block wherein the rotation factor is determined as:

$$\text{Rotation factor}=N_Q\cdot MF^{key}+Qbit^{key}-Q_{MIN},$$

where $MF^{key}$ is the motion flag value of the first block, $Qbit^{key}$ is the Qbit value of the first block, $N_Q$ is the number of allowable Qbit values, and $Q_{MIN}$ is the minimum allowable Qbit value; and
    altering the selected data of the second block in accordance with the rotation factor.

23. The computer readable medium of claim 18, wherein Adaptive Dynamic Range Coding (ADRC) is used and the selected data of the second block is selected from the group consisting of a dynamic range value (DR), minimum value (MIN), maximum value (MAX) and central value (CEN).

24. The computer readable medium of claim 23, wherein data is altered by the rotation factor according to:

$$(VAL^{Rot})_{trans}=(VAL^{Rot}+(256/N)\cdot\text{rotation factor})\bmod 256,$$

where $VAL^{Rot}$ represents the selected data of the second block, $(VAL^{Rot})_{trans}$ represents the altered value of the selected data of the second block, and N represents a range of values for the rotation factor.

25. A computer readable medium containing executable instructions, which, when executed in a processing system, causes the system to perform the steps for recovering lost/damaged data of a first block comprising:
    receiving an altered data of a second block, the altered data created by altering a selected data of the second block in accordance with a rotation factor calculated from a selected data of the first block such that the lost/damaged data of the first block may be estimated;
    determining candidate values of recovered unaltered data corresponding to selected altered data of the second block;

selecting a recovered unaltered value from the candidate values; and determining recovered lost/damaged data of first block from the selected recovered unaltered value.

26. The computer readable medium of claim 25, wherein the candidate values are determined by:

$$VAL^{Rot}=((VAL^{Rot})_{trans}-(256/N)\cdot\text{rotation factor})\bmod 256,$$

where $VAL^{Rot}$ represents recovered unaltered data, $(VAL^{Rot})_{trans}$ represents the altered value of the selected data of the second block, and N represents one of a set of possible rotation factors and is varied for determination of each candidate value.

27. The computer readable medium of claim 25 wherein the lost/damaged data comprises at least one compression parameter, said computer readable medium further comprising instructions, which, when executed by said processing system, perform the steps of:

determining a rotation factor from the recovered unaltered value; and determining at least one of the compression parameters of a first block associated with the second block using the rotation factor.

28. The computer readable medium of claims 25, wherein the recovered unaltered data comprises block parameters.

29. The computer readable medium of claims 25, wherein the lost/damaged data comprises bitstream parameters.

30. The computer readable medium of claim 25, wherein Adaptive Dynamic Range Coding (ADRC) is used and the recovered unaltered data is selected from the group comprising dynamic range value (DR), minimum value (MIN), maximum value (MAX) and central value (CEN).

31. The computer readable medium of claim 25, wherein Adaptive Dynamic Range Coding (ADRC) is used and the lost/damaged data is selected from the group comprising a value representative of a number of bits used to encode data (Qbit) and a motion flag (MF) value.

32. A computer readable medium containing executable instructions, which, when executed in a processing system, causes the system to perform the steps of encoding a stream of data points comprising:

encoding a stream of data points to form a plurality of blocks of encoded data; and altering at least one block parameter of a second block by using a factor that is dependent on a bitstream parameter of a first block, said block parameter representative of the encoding of data points of the block and said bitstream parameter representative of how bits are utilized to encode the first block such that if the bitstream parameter of the first block is lost the factor may be used to estimate the bitstream parameter of the first block.

33. The computer readable medium of claim 32, wherein the data points represent information selected from the group comprising two-dimensional static images, hologram images, three-dimensional static images, video, two-dimensional moving images, three dimensional moving images, monaural sound, and N-channel sound.

34. The computer readable medium of claim 32, wherein the blocks are selected from the group comprising complementary blocks, shifted blocks, randomized blocks, and shuffled blocks.

35. A system for encoding data comprising:

calculating a rotation factor from a selected data of a first block; and altering a selected data of a second block in accordance with the rotation factor such that if the selected date of the first block is lost the rotation factor may be used to estimate the selected date of the first block.

36. The system of claim 35, wherein the selected data of the first block is selected from the group comprising at least one compression parameter, at least one block parameter and at least one bitstream parameter.

37. The system of claim 35, wherein selected data of the second block is selected from the group comprising at least one compression parameter, at least one block parameter and at least one bitstream parameter.

38. The system of claim 35, wherein Adaptive Dynamic Range Coding (ADRC) is used and the selected data of the first block is selected from the group comprising a value representative of a number of bits used to encode data (Qbit) and a motion flag value (MF).

39. The system of claim 35, further comprising:

calculation logic configure to calculate a rotation factor from selected data of the first block wherein the rotation factor is determined as:

$$\text{Rotation factor}=N_Q\cdot MF^{key}+Qbit^{key}-Q_{MIN},$$

where $MF^{key}$ is the motion flag value of the first block, $Qbit^{key}$ is the Qbit value of the first block, $N_Q$ is the number of allowable Qbit values, and $Q_{MIN}$ is the minimum allowable Qbit value; and wherein the altering logic is configured to alter the selected data of the second block in accordance with the rotation factor.

40. The system of claim 35, wherein Adaptive Dynamic Range Coding (ADRC) is used and the selected data of the second block is selected from the group consisting of a dynamic range value (DR), minimum value (MIN), maximum value (MAX) and central value (CEN).

41. The system of claim 40, wherein data is altered by the rotation factor according to:

$$(VAL^{Rot})_{trans}=(VAL^{Rot}+(256/N)\cdot\text{rotation factor})\bmod 256,$$

where $VAL^{Rot}$ represents the unaltered value of the selected data of the second block, $(VAL^{Rot})_{trans}$ represents the altered value of the selected data of the second block, and N represents a range of values for the rotation factor.

42. The system of claim 35, wherein the altering logic is configured in hardware selected from the group comprising at least one ASIC, at least one large scale integration (LSI) component, and at least one processor component.

43. A system for recovering lost/damaged data of a first block comprising:

an input configured to receive an altered data of a second block, the altered data created by altering a selected data of the second block in accordance with a rotation factor calculated from a selected data of the first block such that the lost/damaged data of the first block may be estimated;

candidate value logic configured to determine candidate values of recovered unaltered data corresponding to selected altered data of the second block;

selecting logic configured to select a recovered unaltered value from the candidate values; and determining logic configured to determine lost/damaged data of first block from the selected recovered unaltered value.

44. The system of claim 45, wherein the candidate values are determined by $$VAL^{Rot} = ((VAL^{Rot})_{trans} - (256/N) \cdot \text{rotation factor}) \bmod 256,$$

where $VAL^{Rot}$ represents recovered unaltered data, $(VAL^{Rot})_{trans}$ represents the altered value of the selected data of the second block, and N represents one of a set of possible rotation factors and is varied for determination of each candidate value.

45. The system of claim 43 wherein the lost/damaged data comprises at least one compression parameter, said system further comprising:

determining logic configured to determine a rotation factor from the selected recovered unaltered value;

determining logic configured to determine at least one of the compression parameters of a first block associated with the second block using the rotation factor.

46. The system of claim 43, wherein the recovered unaltered data comprises block parameters.

47. The system of claim 43, wherein the lost/damaged data comprises bitstream parameters.

48. The system of claim 43, wherein Adaptive Dynamic Range Coding (ADRC) is used and the recovered unaltered data is selected from the group comprising dynamic range value (DR), minimum value (MIN), maximum value (MAX) and central value (CEN).

49. The system of claim 43, wherein Adaptive Dynamic Range Coding (ADRC) is used and the lost/damaged data is selected from the group comprising a value representative of a number of bits used to encode data (Qbit) and a motion flag (MF) value.

50. The system of claim 43, wherein the candidate value logic, selecting logic and determining logic are configured in hardware selected from the group comprising at least one ASIC, at least one large scale integration (LSI) component, and at least one processor component.

51. A system of encoding a stream of data points comprising:

an input configured to encode a stream of data points to form a plurality of blocks of encoded data; and altering logic configured to alter at least one block parameter of a second block by using a factor that is dependent on a bitstream parameter of a first block, said block parameter representative of the encoding of data points of the block and said bitstream parameter representative of how bits are utilized to encode the first block such that if the bitstream parameter of the first block is lost the factor may be used to estimate the bitstream parameter of the first block.

52. The system of claim 51, wherein the data points represent information selected from the group comprising:

two-dimensional static images, hologram images, three-dimensional static images, video, two-dimensional moving images, three dimensional moving images, monaural sound, and N-channel sound.

53. The system of claim 51, wherein the blocks are selected from the group comprising complementary blocks, shifted blocks, randomized blocks, and shuffled blocks.

54. An apparatus for encoding data, comprising:

means for calculating a rotation factor from a selected data of a first block; and means for altering a selected data of a second block in accordance with the rotation factor such that if the selected data of the first block is lost the rotation factor may be used to estimate the selected data of the first block.

55. An apparatus for recovering lost/damaged data of a first block comprising:

means for receiving an altered data of a second block, the altered data created by altering a selected data of the second block in accordance with a rotation factor calculated from a selected data of the first block such that the lost/damaged data of the first block may be estimated;

means for determining candidate values of recovered unaltered data corresponding to selected altered data of the second block;

means for selecting a recovered unaltered value from the candidate values; and means for determining recovered lost/damaged data of first block from the selected recovered unaltered value.

* * * * *